United States Patent
Aschauer et al.

(10) Patent No.: US 10,489,564 B2
(45) Date of Patent: Nov. 26, 2019

(54) METHOD AND EXECUTION ENVIRONMENT FOR THE SECURE EXECUTION OF PROGRAM INSTRUCTIONS

(71) Applicant: SIEMENS AKTIENGESELLSCHAFT, München (DE)

(72) Inventors: Hans Aschauer, München (DE); Rainer Falk, Poing (DE); Kai Fischer, Baldham (DE); Markus Heintel, München (DE); Wolfgang Klasen, Ottobrunn (DE); Dominik Merli, Donauwörth (DE); Axel Pfau, München (DE); Stefan Pyka, Markt Schwaben (DE); Daniel Schneider, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 15/568,803

(22) PCT Filed: Jan. 25, 2017

(86) PCT No.: PCT/EP2017/051476
§ 371 (c)(1),
(2) Date: Oct. 24, 2017

(87) PCT Pub. No.: WO2017/137256
PCT Pub. Date: Aug. 17, 2017

(65) Prior Publication Data
US 2018/0341755 A1    Nov. 29, 2018

(30) Foreign Application Priority Data
Feb. 9, 2016 (DE) .................. 10 2016 201 898

(51) Int. Cl.
*G06F 21/31* (2013.01)
*G06F 8/52* (2018.01)
(Continued)

(52) U.S. Cl.
CPC ............. *G06F 21/31* (2013.01); *G06F 8/52* (2013.01); *G06F 9/44589* (2013.01);
(Continued)

(58) Field of Classification Search
USPC ...... 713/150, 155, 163, 181; 726/2, 21, 163, 726/181; 380/255, 264, 276
See application file for complete search history.

(56) References Cited

U.S. PATENT DOCUMENTS

| 2 A * | 7/1836 | Goulding .................. C02F 1/00 57/58.49 |
| 6,950,431 B1 * | 9/2005 | Nozaki ............... H04L 12/4641 370/390 |

(Continued)

FOREIGN PATENT DOCUMENTS

| CN | 1541352 A | 10/2004 |
| CN | 102804194 A | 11/2012 |

(Continued)

OTHER PUBLICATIONS

Japanese Office Action dated Dec. 25, 2018 for Application No. 2017-556821.
(Continued)

*Primary Examiner* — Sharif E Ullah
(74) *Attorney, Agent, or Firm* — Schmeiser, Olsen & Watts LLP

(57) ABSTRACT

Provided is a method for the secure, computer-aided execution of program instructions of an application, including the following method steps. The method includes a step of switching on a learning mode of an execution environment.
(Continued)

The method includes a further step of performing the application in the execution environment while the learning mode is switched on, wherein program instructions of the application are performed for a selected predetermined application scenario and the execution environment assigns a first application scenario-specific validity information to the performed program instructions. The method includes a step of switching on a working mode of the execution environment, wherein, in the working mode, the execution environment checks the first validity information of the program instructions, and wherein the execution environment executes the program instructions as a function of their validity information.

18 Claims, 2 Drawing Sheets

(51) Int. Cl.
| | |
|---|---|
| *G06F 9/445* | (2018.01) |
| *G06F 21/51* | (2013.01) |
| *G06F 21/57* | (2013.01) |
| *G06F 21/52* | (2013.01) |
| *H04L 9/00* | (2006.01) |

(52) U.S. Cl.
CPC .............. *G06F 21/51* (2013.01); *G06F 21/52* (2013.01); *G06F 21/577* (2013.01); *H04L 9/00* (2013.01)

(56) References Cited

U.S. PATENT DOCUMENTS

| | | | | |
|---|---|---|---|---|
| 8,300,811 B2* | 10/2012 | Georgiades | ............ | H04L 9/002 380/30 |
| 8,531,247 B2* | 9/2013 | Dichtl | ................... | G06F 7/588 331/57 |
| 8,843,761 B2* | 9/2014 | Meyer | .................... | G06F 11/28 713/187 |
| 8,892,616 B2* | 11/2014 | Dichtl | .................... | G06F 7/588 708/251 |
| 9,147,088 B2* | 9/2015 | Falk | ....................... | G06F 21/86 |
| 9,641,515 B2* | 5/2017 | Dichtl | .................. | G06F 21/445 |
| 9,674,216 B2* | 6/2017 | Bußer | ..................... | G06F 21/57 |
| 2003/0014663 A1 | 1/2003 | Sormunen et al. | | |
| 2005/0039164 A1* | 2/2005 | Cosimo | .................... | G06F 8/33 717/110 |
| 2007/0050609 A1* | 3/2007 | Ferren | ................. | G06F 11/3466 712/227 |
| 2007/0220351 A1* | 9/2007 | Jung | ....................... | G06F 11/28 714/38.1 |
| 2007/0226191 A1* | 9/2007 | Ha | ..................... | G06F 11/0751 |
| 2008/0215601 A1* | 9/2008 | Seki | ........................ | G06F 11/328 |
| 2008/0224819 A1* | 9/2008 | Callentine | ............... | E05F 17/00 340/2.1 |
| 2009/0210688 A1* | 8/2009 | Kohiga | .................. | G06F 8/4434 713/1 |
| 2010/0293614 A1* | 11/2010 | Vilppola | .................. | G06F 21/51 726/22 |
| 2011/0181509 A1* | 7/2011 | Rautiainen | ............... | G06F 3/017 345/158 |
| 2011/0257627 A1* | 10/2011 | Hovorka | ............ | A61B 5/14532 604/504 |
| 2011/0271344 A1* | 11/2011 | Unagami | ............... | G06F 21/554 726/23 |
| 2012/0116774 A1* | 5/2012 | Forssell | ............... | A61N 1/37217 704/270 |
| 2012/0151440 A1* | 6/2012 | Sakairi | ................. | G06F 9/44505 717/120 |
| 2012/0159570 A1* | 6/2012 | Reierson | .................. | G06F 21/53 726/2 |
| 2013/0156180 A1* | 6/2013 | Hess | ....................... | H04L 9/003 380/28 |
| 2013/0305228 A1* | 11/2013 | Black | ................... | G06F 11/3688 717/131 |
| 2015/0023349 A1* | 1/2015 | Wheeler | ............... | H04L 12/467 370/392 |
| 2015/0283702 A1* | 10/2015 | Izhikevich | ............... | B25J 9/163 700/257 |
| 2015/0347283 A1* | 12/2015 | Gataullin | ............ | G06F 11/3636 717/128 |

FOREIGN PATENT DOCUMENTS

| | | |
|---|---|---|
| CN | 103514245 A | 1/2014 |
| EP | 2870565 A1 | 5/2015 |
| EP | 2891102 A1 | 7/2015 |
| EP | 2605445 B1 | 9/2015 |
| JP | H11175369 A | 7/1999 |
| JP | 2007220106 A | 8/2007 |
| JP | 2008217235 A | 9/2008 |
| JP | 2009199214 A | 9/2009 |
| JP | 2011070355 A | 4/2011 |
| JP | 2016021160 A | 2/2016 |
| WO | WO 2011055417 A1 | 5/2011 |

OTHER PUBLICATIONS

Non-English Chinese Office Action dated Dec. 29, 2018 for Application No. 201780001351.6.
Notice of Allowance dated Feb. 23, 2018, Korean Application No. 10-2017-7031659.
PCT International Search Report dated Apr. 19, 2017 corresponding to PCT International Application No. PCT/EP2017/051476 filed Jan. 25, 2017.

\* cited by examiner

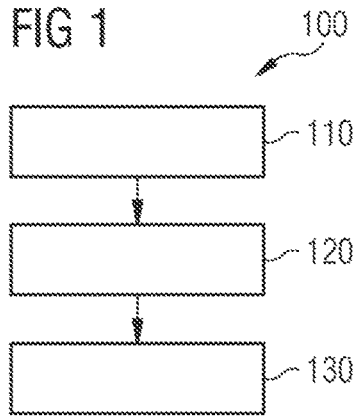

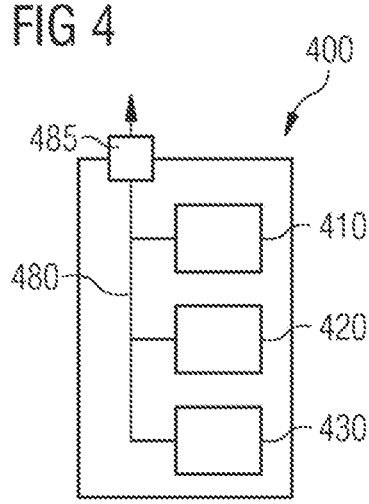
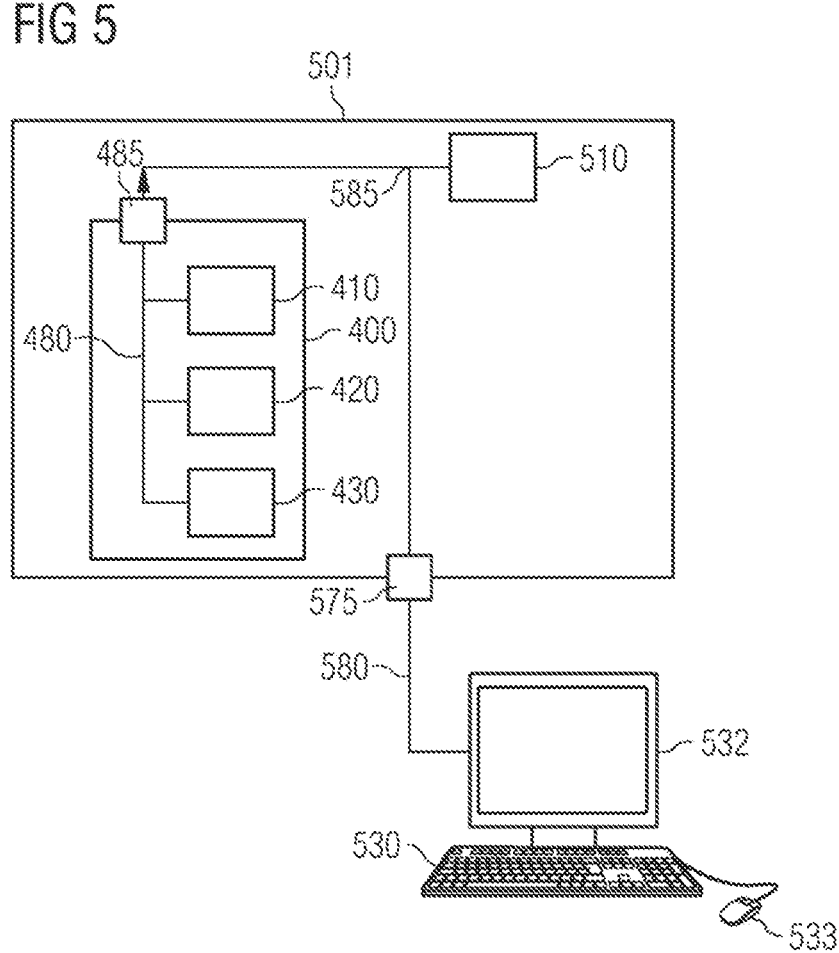

METHOD AND EXECUTION ENVIRONMENT FOR THE SECURE EXECUTION OF PROGRAM INSTRUCTIONS

CROSS-REFERENCE TO RELATED APPLICATIONS

This application claims priority to PCT Application No. PCT/EP2017/051476, having a filing date of Jan. 25, 2017, based off of German application No. 10 2016 201 898.1, having a filing date of Feb. 9, 2016, the entire contents both of which are hereby incorporated by reference.

FIELD OF TECHNOLOGY

The following relates to a method and an execution environment for the secure execution of program instructions of an application.

BACKGROUND

In modern automation systems, IT systems and applications are used for control. Over the course of digitization, highly specialized individual solutions are being replaced by generic multipurpose systems. These multipurpose systems are adapted to suit the respective specific purpose by dynamic configuration (of the application). In this case, the functionality not used for the specific purpose remains on the system. In principle, superfluous/unused functionality is a possible risk. The function can be intentionally (through manipulating) or unintentionally executed and leads to an unwanted system state. An example is the Heartbleed bug in SSL/TLS, which for a long time was hidden in a typically unneeded part of the affected SSL/TLS library. Nevertheless, the function was available on most systems and could be exploited.

SUMMARY

An aspect relates to a method and an execution environment for the secure execution of program instructions of an application, said method being able to be performed with little complexity.

According to a first aspect of embodiments of the invention for the secure computer-aided execution of program instructions of an application relates to a method having the following method steps:

In one method step, a learning mode of an execution environment is switched on.

In a further method step, the application is executed in the execution environment while the learning mode is switched on, wherein program instructions of the application are performed for a selected prescribed application scenario and the execution environment assigns a first piece of application scenario specific validity information to the performed program instructions.

In a further method step, a working mode of the execution environment is switched on, wherein in the working mode the execution environment checks the first piece of validity information of the program instructions, and wherein the execution environment executes the program instructions on the basis of their validity information.

In connection with the patent application, an application can be understood to mean an executable file or a program library.

In connection with the patent application, an execution environment can be understood to mean a virtual machine, for example a Java virtual machine, a processor or an operating system environment. The execution environment may be realized on a physical computation unit (processor, microcontroller, CPU, CPU core). In this case, the execution of the application in a learning mode and in an execution mode can be effected on the same physical computation unit. Similarly, it is possible for the execution of the application in a learning mode to be effected in another physical computation unit, for example. It is thus possible, e.g. for the training to be effected in a special training computation unit, for example. The execution in an execution mode is effected in a second computation unit, for example, in which case the validity information ascertained during training is used for the execution in the execution computation unit. The validity information ascertained by the training computation unit, for example, is preferably provided in a manipulations-proof manner.

In connection with the patent application, program instructions can be understood to mean the program instructions that an application as a whole, preferably including the libraries used, comprises.

In connection with the patent application, execution paths can be understood to mean subareas of the application that comprise multiple directly successively executable program instructions and that are associated with a particular sub-functionality of the application, in particular. Execution paths may also be subareas that are executed on the basis of a condition, for example an "If Else" condition.

In connection with the patent application, validity information can be understood to mean a first piece of validity information and/or a second piece of validity information and/or a third piece of validity information.

In connection with the patent application, a device can be understood to mean a controller for a fire extinguishing system, a monitoring device for monitoring voltage spikes for high voltage or a field device, for example.

In connection with the patent application, an application scenario or a selected prescribed application scenario can be understood to mean an application scenario for an application, which application scenario serves only one particular purpose. This may be a controller (on which the application runs), for example, that monitors voltage spikes in a power plant and takes controlling action if need be. In this case, the hardware components with which the controller communicates and the operational environment may be precisely stipulated. This can mean that, by way of example, only input values having particular expected value ranges are transferred to the application, and also only functions, or the program instructions thereof, are used that are necessary for monitoring a particular voltage range for high voltage, for example. Functions that would be used only for low voltage would not be performed or used in a selected prescribed application scenario for high voltage.

In connection with the patent application, "without validity information" can be understood to mean that a program instruction and/or a subroutine/function and/or a program library has no associated validity information. If every program instruction has a particular associated memory area in which the validity information can be stored, for example, then for a program instruction without validity information this memory area can be filled with zeros, for example, or another value that indicates that this program instruction has no validity information available. "Without validity information" can additionally be understood to mean that a program instruction has an associated piece of invalidity information.

The method achieves a high level of security for applications that, by way of example, are executed on a particular device, for example a field device, since execution of program instructions without validity information is suppressed. This means, by way of example, that unperformed program instructions are without validity information, that is to say have no validity information. Before the learning mode is activated, validity information on hand can be selectively erased, for example, so that no program instruction has an associated piece of validity information before the learning mode is switched on.

It is also possible, by way of example, for the switching-on of the working mode to be protected by a security mechanism, for example a password or an activation code or a cryptographic method, particularly in the form of a digital certificate or a license file structure.

By way of example, different modes of operation are also conceivable. It is thus possible, by way of example, for the learning mode and the working mode to be able to be executed in parallel so that the performed program instructions for the application scenario are captured as completely as possible. By way of example, it is alternatively possible for the switching-on of the working mode to automatically switch off the learning mode. If the learning mode is switched on, on the other hand, the working mode is automatically switched off. Depending on the desired response of the modes of operation of the work environment, this can be configured in a preferable manner.

In a first embodiment of the method, the performed program instructions are assigned to followed execution paths of the application and a second piece of application-scenario-specific validity information is respectively assigned to an execution path.

As a result of only the execution path, for example in the case of an "If Else" condition, being assigned a piece of validity information, the execution time of the method can be improved.

In further embodiments of the method, the first piece of validity information is assigned during a first learning phase and during a second learning phase the execution environment assigns a third piece of application-scenario-specific validity information to the performed program instructions.

This allows the assignment of the validity information to be improved. This can be effected, by way of example, by virtue of the first learning phase being performed when function tests are performed during the manufacture of a device on which the application is intended to be executed. The second learning phase can then be executed with the customer, involving the device and the application executing the selected prescribed application scenario, for example overload control in a power supply system. This allows the period of time for capturing the validity information to be reduced for the customer.

In further embodiments of the method, the execution environment used is a processor and/or a virtual machine and/or an operating system core or an operating system core using a memory management unit.

Depending on the application, one possibility is that this allows a more easily implemented variant to be realized, for example by virtue of the program instructions in the bytecode of a Java application being assigned the validity information. Alternatively, a very high level of security for the execution of the application can be achieved by virtue of a piece of validity information being respectively assigned to a machine instruction on a processor.

It is alternatively possible for CPU instructions of the application (can also be called binary) to be assigned a piece of validity information in order to achieve average security, for example.

In general, it is possible, by way of example, for the validity information to be integrated directly into the execution environment by virtue of a specific memory or memory area being provided therefor. The validity information may alternatively be stored outside the execution environment, for example as a file that is preferably cryptographically protected. The execution environment then accesses the validity information in the file at program runtime. In this regard, it may be necessary for the execution environment to have the applicable cryptographic keys if need be.

In further embodiments of the method, a trigger erases the first piece of validity information and/or the second piece of validity information and/or the third piece of validity information of the program instructions.

In situations in which, by way of example, a controller has been used for monitoring high voltage for a first voltage range and is now intended to be used for monitoring high voltage for a second voltage range, it makes sense for the no longer required functions (or the program instructions thereof) for monitoring the first voltage range not to have further validity information. The trigger, which is preferably protected by a security mechanism, for example a password or a cryptographic method, can simply erase the validity information if need be.

In further embodiments of the method, the first piece of validity information and/or the second piece of validity information and/or the third piece of validity information are stored in a security-protected manner.

The validity information can be stored in a security-protected manner, for example, by virtue of cryptographic methods such as symmetric encryption, asymmetric encryption or a digital signature being formed by means of the validity information so that the integrity thereof can be checked. It is also possible for security-protected storage to be achieved by virtue of the device, for example a controller for monitoring high voltage on which the application is executed, being sealable, so that a memory module on which the validity information is stored is also physically inaccessible (physically secure). This has the advantage that the security of the method is increased once again.

In further embodiments of the method, the switching-on of the learning mode is protected by a security mechanism.

As a result of the switching-on of the learning mode or of the working mode being protected by a security mechanism, a higher level of security for the method is achieved. The security mode can be realized by means of cryptographic methods, for example, or it is possible for the learning mode to be switched on only at predefined times and/or in predefined situations. This may be during the manufacture of a device on which the application is executed, for example. In this situation, there is access to a sealable memory unit that is inaccessible during regular operation (in the working mode particularly at the place of use of the device), for example. A predefined time may also be a phase for system tests or during the debugging of the application on the device, for example.

In further embodiments of the method, the first piece of validity information and/or the second piece of validity information and/or the third piece of validity information are provided to a further device.

This makes it possible in a simplest possible manner to transmit the validity information for applications having the same application scenario. If multiple devices having the application are used in a power plant in order to monitor voltage spikes for high voltage at different locations in an identical manner, for example, it is first of all possible for the validity information for the program instructions for a device and the application thereof to be captured and for the validity information to be transmitted to the other devices, for example. For the transmission, the validity information may in turn be cryptographically protected and the transmission could preferably be performed in automated fashion.

In further embodiments of the method, the execution of the application in the execution environment during the switched-on learning mode is performed on a device and/or on a test device of identical design and/or on a simulation environment of the device.

This allows the validity information to be captured in a simplest possible manner.

In further embodiments of the method, the first piece of validity information and/or the second piece of validity information and/or the third piece of validity information are assigned to the program instructions on an instruction-by-instruction basis and/or on a subroutine-by-subroutine basis and/or on a library-by-library basis.

As a result of the validity information being able to be assigned in such a flexible fashion, the validity information is not assigned to every single line in the program code of the application, for example, but rather a piece of validity information can also be assigned to a subroutine/function or a program library according to the situation. This has the advantage that the execution time of the application is improved, for example, since a piece of validity information does not need to be evaluated for every program line.

In further embodiments of the method, program instructions that are dependent on the program instructions having the first piece of validity information and/or the second piece of validity information and/or the third piece of validity information are assigned an applicable piece of validity information.

As a result, validity information can already be assigned to the application by the programmer, for example. This has the advantage, in particular, that the duration of the learning mode for assigning all the necessary validity information for an application scenario can be shortened.

In further embodiments of the method, the execution of program instructions without validity information involves a piece of signaling information being provided.

As a result, it is preferably possible to identify when program instructions that are actually not necessary for the application scenario are executed. The signaling information can be transmitted to a control console or a security monitoring system, for example, so that engineers in a power plant, for example, check the application and the device on which the application is installed. As a result, it is preferably possible to identify manipulations of the application or of the device or of the work environment of the device. This signaling information can be generated by an interrupt or an exception that is stored for program instructions without validity information, for example.

In further embodiments of the method, the switching-on of the working mode involves program instructions without validity information being removed from the application.

This increases the security of the application, since unnecessary program instructions or program codes are removed from the application. As a result, an attacker has no possibility of using program parts that are unused for the application scenario.

According to a further aspect of embodiments of the invention relates to an execution environment for the secure computer-aided execution of program instructions of an application. The execution environment comprises a first switching module for switching on a learning mode of the execution environment. The execution environment additionally comprises an execution module for executing the application in the execution environment while the learning mode is switched on, wherein program instructions of the application are performed for a selected prescribed application scenario and the execution environment assigns a first piece of application-scenario-specific validity information to the performed program instructions. The execution environment additionally comprises a second switching module for switching on a working mode of the execution environment, wherein in the working mode the execution environment checks the first piece of validity information of the program instructions, and wherein the execution environment executes the program instructions on the basis of their validity information.

The first switching module and the second switching module may be configured as an integral switching module, for example, that allows the learning mode or the working mode to be switched on in each case.

In a first embodiment of the execution environment, the execution environment is a processor or a virtual machine or an operating system core or an operating system core using a memory management unit.

According to a further aspect embodiments of the invention relates to a system that has an execution environment according to embodiments of the invention.

Moreover, a computer program product having program instructions for performing the cited method according to embodiments of the invention is claimed.

Additionally, a variant of the computer program product having program instructions for configuring a creation device, for example a 3D printer or a similar device, is claimed, wherein the creation device is configured with the program instructions such that the cited execution environment according to embodiments of the invention is created.

Furthermore, a provision apparatus for storing and/or providing the computer program product is claimed. The provision apparatus is a data storage medium that stores and/or provides the computer program product, for example. Alternatively and/or additionally, the provision apparatus is a network service, a computer system, a server system, particularly a distributed computer system, a cloud-based computer system and/or a virtual computer system that stores and/or provides the computer program product preferably in the form of a data stream, for example.

This provision is effected as a download in the form of a program data block and/or instruction data block, preferably as a file, particularly as a download file, or a data stream, particularly as a download data stream, of the complete computer program product, for example. This provision can alternatively be effected as a partial download that consists of multiple parts and is downloaded particularly via a peer-to-peer network or provided as a data stream, for example. Such a computer program product is read in, for example using the provision apparatus in the form of the data storage medium, in a system and executes the program instructions, so that the method according to embodiments of the invention is executed on a computer, or configures the creation device such that it creates the execution environment according to embodiments of the invention.

BRIEF DESCRIPTION

Some of the embodiments will be described in detail, with references to the following figures, wherein like designations denote like members, wherein:

FIG. 1 shows a flowchart for a first exemplary embodiment of the disclosed method;

FIG. 2 illustrates a second exemplary embodiment of the disclosed method;

FIG. 3 illustrates a third exemplary embodiment of the disclosed method;

FIG. 4 shows an execution environment of a fourth exemplary embodiment; and

FIG. 5 shows a system with an execution environment.

In the figures, elements that have the same function are provided with the same reference symbols, unless indicated otherwise.

In this case, the explanations below refer to all of the exemplary embodiments.

DETAILED DESCRIPTION

FIG. 1 shows a flowchart for a first exemplary embodiment of the disclosed method 100. The method 100 is suitable for the secure execution of program instructions of an application on a computer or a device, for example a controller for a fire extinguishing system, a monitoring device for monitoring voltage spikes for high voltage or a field device.

In this regard, the method 100 has a first method step for switching on 110 a learning mode of an execution environment. The execution environment is used particularly for executing the application, and it may be a processor, an operating system linker, a program linker or a virtual processor or a virtual machine, such as the Java virtual machine, for example. The switching-on of the learning mode is protected by a security mechanism, for example, such as password input or cryptographically protected user authentication.

The method 100 additionally comprises a second method step for executing 120 the application in the execution environment while the learning mode is switched on, wherein program instructions of the application are performed for a selected prescribed application scenario and the execution environment assigns a first piece of application-scenario-specific validity information to the performed program instructions. In this regard, it is possible to use a data structure that stores a piece of validity information for every performed program instruction, for example. Unperformed program instructions can be assigned a piece of invalidity information, for example, particularly in the form of a zeroed data block, an exception or an interrupt. The data structure can initially include only invalidity information as an initial value, and this invalidity information is then partly or wholly overwritten with validity information during the learning phase.

In one variant, the invalidity information is determined by virtue of there being no validity information on hand for a program instruction.

The method 100 additionally comprises a third method step for switching on 130 a working mode of the execution environment, wherein in the working mode the execution environment checks the first piece of validity information of the program instructions, and wherein the execution environment executes the program instructions on the basis of their validity information. If a program instruction having a piece of invalidity information is nevertheless executed during the working mode by mistake, it is possible for the associated exception to be thrown, for example, and particularly for a piece of signaling information to be used to preferably inform an administrator. The signal information can alternatively be used to put the application, the execution environment or the device on which the application is executed into a secure state. The applicable program instruction having the invalidity information is then preferably not executed.

The switching-on of the working mode is protected by a security mechanism, for example, such as password input or cryptographically protected user authentication.

The disclosed method 100 allows unused functionalities of an application, for example a library or an application in operation, to be rendered inaccessible.

In this case, unused program instructions or code parts are identified as automatically as possible and in a manner that is transparent to the user. In this regard, it is possible for evaluations to be provided that indicate which program instructions have been assigned validity information and which program instructions have been assigned invalidity information, for example.

By way of example, a developer can, following appraisal of the evaluation, still manually assign validity information to individual program instructions if this is necessary in the context of particular input data for the application.

In other words, the execution environment in the learning mode also logs the program instructions of all followed/reached execution paths. This is illustrated in a second exemplary embodiment in FIG. 2, for example. In this case, FIG. 2 shows a first block of program instructions 210, each of which has an associated piece of validity information E, a second block of program instructions 215, each of which has an associated piece of invalidity information NE, and a third block of program instructions 220, each of which has an associated piece of validity information E.

During the learning mode, it is preferably necessary for all the valid states, that is to say all the states that the application can assume for the selected prescribed application scenario, to be passed through.

The learning mode can be effected at different times, for example:

By way of example, a learning phase can be effected for an application scenario, for example in the case of software validation, in the case of acceptance/certification for an automation installation. This can alternatively be effected when sealing configuration settings of the device, when loading or installing program code for the application. This information is stored together with the executed program code of the application. The data 225, that is to say the validity information E and/or the invalidity information NE, can be stored directly in the program code, for example as a flag in the opcode, as a flag at entry points (functions) for a program library, which is also referred to as annotation of object code or annotation of binary code. Alternatively, these data can be stored as separate metadata.

In another variant, the code is modified. It is thus possible for e.g. unmarked opcodes, that is to say program instructions 215 without validity information, to be replaced by NOPs, TRAPs or exceptions.

It is alternatively possible for multiple learning phases to be used for assigning the validity information 225:

In this regard, the learning mode can be switched on during a first learning phase as early as during the system test of the manufacturer of a device, in which particular or typical application scenarios are tested. As a result, it is possible to generate a data record with a basic configuration with validity information for the application.

This basic configuration generated in advance can then be configured further by the user as a result of the learning mode being switched on again. This allows a second learning phase directly at the place of use, that is to say the selected prescribed application scenario, of the device to be shortened.

This basic configuration can be produced using the data from the system test, for example, which data can be refined further during an operative learning phase at the place of use of the device. The learnt data 225 (separate metadata or annotated object code/binary code), that is to say validity information and/or invalidity information, can—in one variant—be provided to another device in cryptographically protected form, for example as a digitally signed data record.

It is also possible for the learning mode to be switched on on different devices or for the learning phases to be executed on different devices:
- on the target device itself, that is to say the device on which the selected prescribed application scenario is intended to be used;
- on a test device of identical design (e.g. not operatively in use for the selected prescribed application scenario);
- in a simulation environment of the target device (digital twin).

In a strict interpretation, preferably all the program parts (that is to say the program instructions of the program parts) associated with an application scenario that are intended to be executable later are actually performed while the learning mode is switched on.

In a further variant, fuzzy learning is alternatively imaginable, i.e. with the learning mode switched on a piece of validity information is respectively assigned to a program instruction in an extended area.

In this regard, different gradations are conceivable, for example:
- in the "fine" gradation, every instruction used in a program instruction, that is to say also the instructions of the subroutines and program libraries, is assigned a piece of validity information E.
- In the "medium" gradation, the subroutines of the performed program instructions are assigned a piece of validity information E. In this case, it is also possible to take into consideration a call depth of subroutines, for example, in order to keep down the complexity for assignment of the validity information E particularly in the case of nested functions.
- In the "coarse" gradation, the program libraries used by the application are respectively assigned a piece of validity information E so as thereby to assign a piece of validity information particularly to all the program instructions of the program library.

The gradations granularity could also be controlled by suitable structure statements during the code development of the application, for example. In this regard, a developer could manually assign a piece of validity information to particular program instructions and to program instructions, instructions, subroutines or program libraries that are dependent thereon.

By way of example, this can also be realized by virtue of the validity information being taken into consideration such that dependencies can be taken into consideration. If a first instruction path is valid (it has been assigned a piece of validity information), for example, then a second dependent instruction path is automatically also likewise valid. In this case, either the second instruction path can automatically likewise be assigned a piece of validity information or the second instruction path is valid as a result of its dependency, for example. In other words, the validity information can be passed on from the first instruction path to the second instruction path on account of the dependency of the second instruction path on the first instruction path, for example.

In the working mode, the execution environment preferably only accepts or executes program instructions that have an associated piece of validity information E, which can also be referred to as an admissibly marked program instruction. If there is a jump to a program instruction NE without validity information, that is to say a program instruction that is not marked as admissible, then this results in an exception or in a different instruction that has been stored, for example, or in other words the instruction that has overwritten the inadmissible program instruction, for example.

Should, after the assignment of the validity information 225, a device require an extended or new set of program instructions and/or functions and/or subroutines and/or libraries as a result of reconfiguration or use in a slightly altered application scenario, there is the possibility of the assigned validity information 225 being removed again under the control of a trigger, such as a configuration datum and/or a manual trigger in a relearning phase, for example. In this regard, the learning mode is switched on again and validity information is assigned to the program instructions in accordance with the altered application scenario or the reconfiguration. As a result, the previously inadmissible program instructions (or program instructions without validity information) can be rendered usable again. Should a code area have been removed by NOPs, traps or exceptions, these code portions can be passed back from a backup copy of the unaltered application or the program libraries thereof.

In a further variant, the method is realized directly in hardware. In this case, a processor that depicts the work environment, for example a CPU, has a first mode, the learning mode, and a second mode, the working mode. In the first mode, the performed opcodes, that is to say the performed program instructions, are marked, that is to say are assigned a piece of validity information, and stored in the program image. After changeover to the working mode, only the marked instructions of an application are now accepted.

In a further variant, the method is realized by means of a work environment in the form of a virtual machine. The virtual machine records the executed code lines of an application, that is to say the performed program instructions of the application, in a learning mode and generates a log file that includes the validity information assigned to the program instructions. The assignment of the validity information can be made directly when an entry in the log file is generated.

During later execution of the application, the virtual machine uses the log file to check, in a working mode, whether a program instruction can be executed. The integrity/authenticity of the log file may be secure as a result of a digital signature that is checked by the virtual machine, for example.

FIG. 3 illustrates a third exemplary embodiment of the disclosed method. In this exemplary embodiment, the method is realized by means of an operating system core. The application is started in the learning mode by the operating system core in a controlled environment, for example a debugger. The performed program instructions 310, 320 are captured by virtue of their being assigned a piece of validity information. The program instructions and the validity information can then be stored. In the working mode, the runtime loader uses this validity information in order to instrument the program code, that is to say the program instructions of the application. By way of example, all the unperformed code lines, that is to say the program instructions without validity information, can be replaced by traps.

In a further variant, the method is realized by means of an operating system core using the memory management unit, MMU.

An application is started in the learning mode by the operating system core in a controlled environment, for example a debugger. The performed program instructions are captured by virtue of their respectively being assigned a piece of validity information. The program instructions and the validity information can then be stored.

The program instructions to which no validity information is assigned, that is to say program instructions without validity information—also called unmarked code parts—are denoted by the memory management unit as unexecutable or as unreadable. On access (loading of the program instructions from external memory in cache), the memory management unit preferably triggers a trap or an interrupt.

FIG. 4 shows an execution environment 400 of a fourth exemplary embodiment for the secure computer-aided execution of program instructions of an application. The execution environment 400 comprises a first switching module 410, an execution module 420, a second switching module 430 and an interface 485, which are communicatively connected to one another via a first bus 480.

The first switching module 410 switches on a learning mode of the execution environment 400.

The execution module 420 executes the application in the execution environment 400 while the learning mode is switched on, wherein program instructions of the application are performed for a selected prescribed application scenario and the execution environment 400 assigns a first piece of application-scenario-specific validity information to the performed program instructions.

The second switching module 430 switches on a working mode of the execution environment 400, wherein in the working mode the execution environment 400 checks the first piece of validity information of the program instructions, and wherein the execution environment executes the program instructions on the basis of their validity information.

The execution environment may be installed as a processor or as a virtual machine on a chip, for example, particularly in the form of embedded Java, in a device, for example a field device, a controller or a measuring device. The device may be part of a system, the device being connected to a workstation of an operator via a data bus.

Such a system is shown in FIG. 5 as a fifth exemplary embodiment, for example. Specifically, FIG. 5 shows a system, for example a monitoring system for high voltage in a power plant.

A workstation, for example an IBM-compatible computer system, comprising a display device 532, for example a screen, and multiple input devices, for example a computer mouse 533 and a keyboard 530, is communicatively connected to a device 501 via a third bus 580 and a second interface 575 of the device 501. The third bus 580 may be an Ethernet bus or a universal serial bus (USB), for example.

The device 501 comprises an execution environment 400 for the secure computer-aided execution of program instructions of an application in selected prescribed application scenarios, for example high voltage monitoring with the associated measuring methods. In the device 501, the execution environment is connected to a capture device 510, for example a voltage measuring sensor, and the second interface 575 via a second bus 585, for example, by means of the interface 485.

If, during the monitoring of high voltage or of voltage spikes, for example, a program instruction is executed that has no associated validity information, then the execution environment can throw an exception that is then displayed to an operator on the workstation. The operator can then perform checks, if need be, to determine whether there has been a random malfunction of the application or whether manipulation of the application by an unauthorized third party has taken place.

Although the invention has been described and illustrated in detail by way of the preferred exemplary embodiment, the invention is not restricted by the disclosed examples and other variations can be derived herefrom by a person skilled in the art without departing from the scope of protection of the invention.

For the sake of clarity, it is to be understood that the use of 'a' or 'an' throughout this application does not exclude a plurality, and 'comprising' does not exclude other steps or elements.

The invention claimed is:

1. A method for the secure computer-aided execution of program instructions of an application, the method comprising:
    switching on a learning mode of an execution environment;
    executing the application in the execution environment while the learning mode is switched on, wherein:
        program instructions of the application are performed for a selected prescribed application scenario; and
        the execution environment assigns a first piece of application-scenario-specific validity information to the performed program instructions; and
    switching on a working mode of the execution environment, wherein in the working mode, the execution environment checks the first piece of application-scenario-specific validity information of the program instructions, wherein the execution environment executes the program instructions on a basis of application-scenario-specific validity information of the program instructions;
    wherein the first piece of application-scenario-specific validity information is assigned during a first learning phase; and during a second learning phase, the execution environment assigns a third piece of application-scenario-specific validity information to the performed program instructions; and
    wherein the execution of the application in the execution environment during the switched-on learning mode is performed on a device and/or on a test device of identical design and/or on a simulation environment of the device.

2. The method as claimed in claim 1, wherein the performed program instructions are assigned to followed execution paths of the application and a second piece of application-scenario-specific validity information is respectively assigned to an execution path.

3. The method as claimed in claim 1, wherein the execution environment used is a processor and/or a virtual machine and/or an operating system core or an operating system core using a memory management unit.

4. The method as claimed in claim 1, wherein a trigger erases the first piece of application-scenario-specific validity information and/or the second piece of application-scenariospecific validity information and/or the third piece of application-scenario-specific validity information of the program instructions.

5. The method as claimed in claim 1, wherein the first piece of application-scenario-specific validity information and/or the second piece of application-scenario-specific validity information and/or the third piece of application-scenario-specific validity information are stored in a security-protected manner.

6. The method as claimed in claim 1, wherein the switching-on of the learning mode is protected by a security mechanism.

7. The method as claimed in claim 1, wherein the first piece of application-scenario-specific validity information and/or the second piece of application-scenario-specific validity information and/or the third piece of application-scenario-specific validity information are provided to a further device.

8. The method as claimed in claim 1, wherein the first piece of application-scenario-specific validity information and/or the second piece of application-scenario-specific validity information and/or the third piece of application-scenario-specific validity information are assigned to the program instructions on an instruction-by-instruction basis and/or on a subroutine-by-subroutine basis and/or on a library-by-library basis.

9. The method as claimed in claim 1, wherein program instructions that are dependent on the program instructions having the first piece of application-scenario-specific validity information and/or the second piece of application-scenario-specific validity information and/or the third piece of application-scenario-specific validity information are assigned an applicable piece of validity information.

10. The method as claimed in claim 1, wherein the execution of program instructions without validity information involves a piece of signaling information being provided.

11. The method as claimed in claim 1, wherein the switching-on of the working mode involves program instructions without validity information being removed from the application.

12. An execution environment for the secure computer-aided execution of program instructions of an application, comprising:

a first switching module for switching on a learning mode of the execution environment;

an execution module for executing the application in the execution environment while the learning mode is switched on, wherein:

program instructions of the application are performed for a selected prescribed application scenario;

the execution environment assigns a first piece of application-scenario-specific validity information to the performed program instructions; and a second switching module for switching on a working mode of the execution environment, wherein in the working mode, the execution environment checks the first piece of application-scenario-specific validity information of the program instructions, and wherein the execution environment executes the program instructions on a basis of application-scenario-specific validity information of the program instructions.

13. The execution environment as claimed in claim 12, wherein the execution environment is a processor or a virtual machine or an operating system core or an operating system core using a memory management unit.

14. A system having an execution environment as claimed in claim 12.

15. A computer program product, comprising a computer readable hardware storage device having computer readable program code stored therein, said program code executable by a processor of a computer system to implement the method as claimed in claim 1.

16. A computer program product, comprising a computer readable hardware storage device having computer readable program code stored therein, said program code executable by a processor of a computer system and for a creation device that is configured by means of the program instructions to create the execution environment as claimed in claim 12.

17. A provision apparatus for the computer program product as claimed in claim 15, wherein the provision apparatus stores and/or provides the computer program product.

18. A provision apparatus for the computer program product as claimed in claim 16, wherein the provision apparatus stores and/or provides the computer program product.

* * * * *